United States Patent [19]

Durkee et al.

[11] Patent Number: 4,538,156

[45] Date of Patent: Aug. 27, 1985

[54] INK JET PRINTER

[75] Inventors: David B. Durkee, Arlington Heights; Alan J. Liebman, Skokie, both of Ill.

[73] Assignee: AT&T Teletype Corporation, Skokie, Ill.

[21] Appl. No.: 497,386

[22] Filed: May 23, 1983

[51] Int. Cl.[3] .............................................. G01D 15/16

[52] U.S. Cl. ....................................... 346/21; 346/134; 346/140 R

[58] Field of Search ................... 346/140, 75, 21, 134; 355/3 TR

[56] References Cited

U.S. PATENT DOCUMENTS

| | | | |
|---|---|---|---|
| 2,938,948 | 5/1960 | Hell | 346/21 X |
| 3,689,693 | 9/1972 | Cahill | 346/75 X |
| 3,898,670 | 8/1975 | Erikson | 346/21 |
| 4,293,866 | 10/1981 | Takita | 346/140 R |
| 4,362,378 | 12/1982 | Erskine | 355/3 TR |

OTHER PUBLICATIONS

Damm, Jr., E. P., Nonclogging Ink-Jet Printer, IBM TDB, vol. 15, No. 4, Sep. 1972, p. 1191.

Slaughter, G. T., Ink Jet Printer/Copier, IBM TDB, vol. 21, No. 2, Jul. 1978, pp. 698-699.

Gardner, William R., Drum-Type Ink Jet Orthographic Printer, Xerox Disclosure Journal, vol. 4, No. 2, Mar./Apr. 1979, p. 247.

*Primary Examiner*—Joseph W. Hartary
*Attorney, Agent, or Firm*—A. A. Tirva

[57] ABSTRACT

An ink jet printer utilizing a smooth surfaced transfer drum is shown as an illustrative embodiment of the invention. The transfer drum and the print head assembly are mounted between a pair of side plates (only one of which is shown in the drawing). A print head assembly, which comprises a number of ink jet nozzles, is also mounted between the side plates. The print head assembly is spaced apart from the drum and the nozzles thereof are spaced at equal distances along a line which is parallel to the axis of the drum. The print head assembly is movable in fine steps from left to right so that on successive rotations of the drum each nozzle is directed to a new track of a succession of tracks. After all tracks of the transfer drum have been served by a nozzle assembly, a printing medium, e.g., paper is brought in rolling contact with the drum to transfer the indicia on the drum to the printing medium while the print head assembly is returned to its starting position; and thereafter, if required, the drum is wiped clean in preparation for receiving the next page of information.

1 Claim, 10 Drawing Figures

FIG. 6
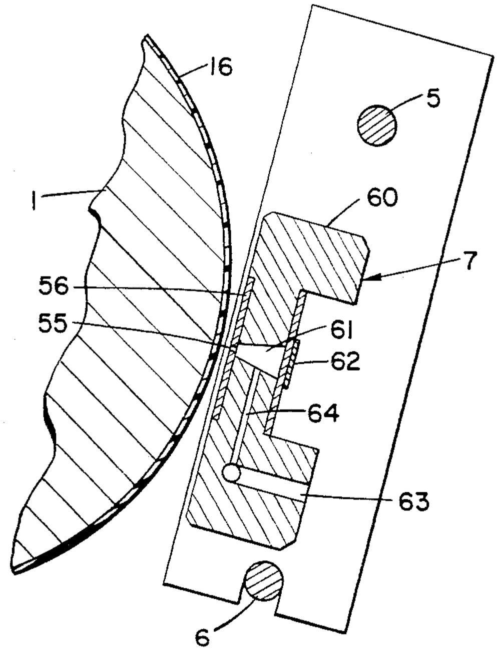
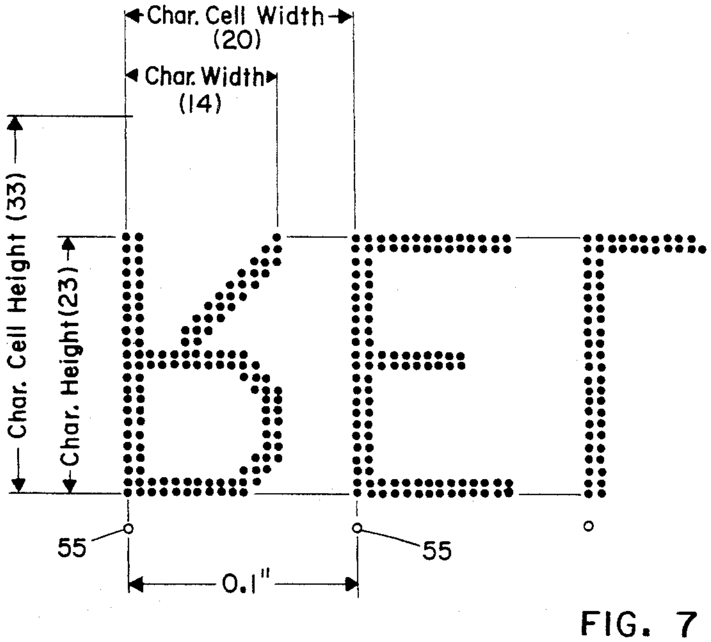
FIG. 7

INK JET PRINTER

DESCRIPTION

1. Technical Field

Ink jet printers.

2. Background Art

In the prior art there are ink jet printers which comprise: an ink source, a printing head connected to the ink source for projecting droplets of ink under the control of electrical input signals representative of information to be printed; a printing medium e.g.; a sheet or strip of paper located in the paths of the projected ink droplets; and an arrangement for providing relative motion between the printing head and the printing medium. While such printers have enjoyed substantial commercial success, they are not without several inherert difficulties. For example, known ink jet printers tend to produce inconsistent printed copies. A principal reason for inconsistent results is the inability to maintain close control of the spacing between the printing medium and the exit of the printing head. It is common practice to have a relatively large gap between the printing hend and the printing medium so as to avoid damaging contact of the printing medium and the face of the print head; and to reduce the collection of paper lint and other debris on the print head. Any variations in the gap will result in variations in placement of dots on the printing medium. In ink jet printers which print directly onto a printing medium, variations in the gap tend to occur over rather small distances and this leads to noticeable, abrupt variations in print quality.

Notwithstanding the use of a large gap, contamination occurs in prior art printers which causes printing errors and, in the extreme, causes complete failure of the print head to print.

Additionally, prior art ink jet printers have intricate paper paths because the paper must move past the print head, and because the print head position in the printer is constrained by requirements of liquid ink flow, proximity to an ink supply, etc. Intricate paper paths tend to reduce reliability of the paper handling mechanism of these printers.

DISCLOSURE OF THE INVENTION

In accordance with the present invention an ink jet printer comprises: a source of ink; one or more print heads each having at least one ink jet for discharging droplets of ink; a transfer medium having a moving surface thereof adjacent to but spaced apart from the jet of each print head; circuitry for controlling the print head to project droplets of ink onto the transfer medium to create patterns of droplets thereon; and an arrangement for transfering the droplet patterns from the transfer medium to paper or another printing medium.

In the event that not all of the ink on the transfer medium is transferred to the printing medium it is necessary to clean the transfer medium prior to the time that new indicia are placed thereon.

THE DRAWINGS

FIG. 6 is a cross sectional view of the print head of FIG. 1;

FIG. 7 illustrates the appearance of indicia on the transfer medium as viewed from the printing head;

DETAILED DESCRIPTION

Figure 1:
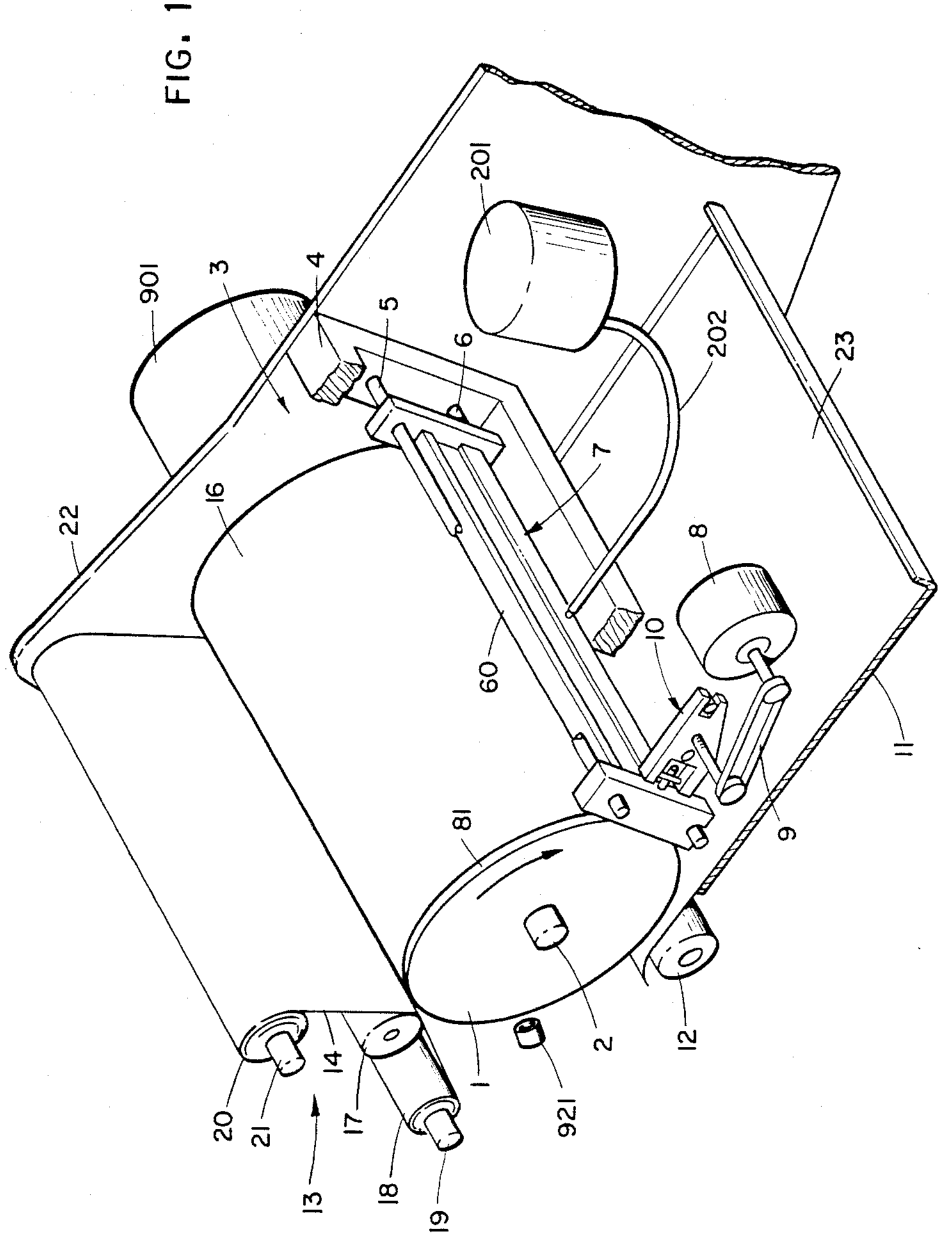
FIG. 1 is a perspective view of a printer.
Figure 9:
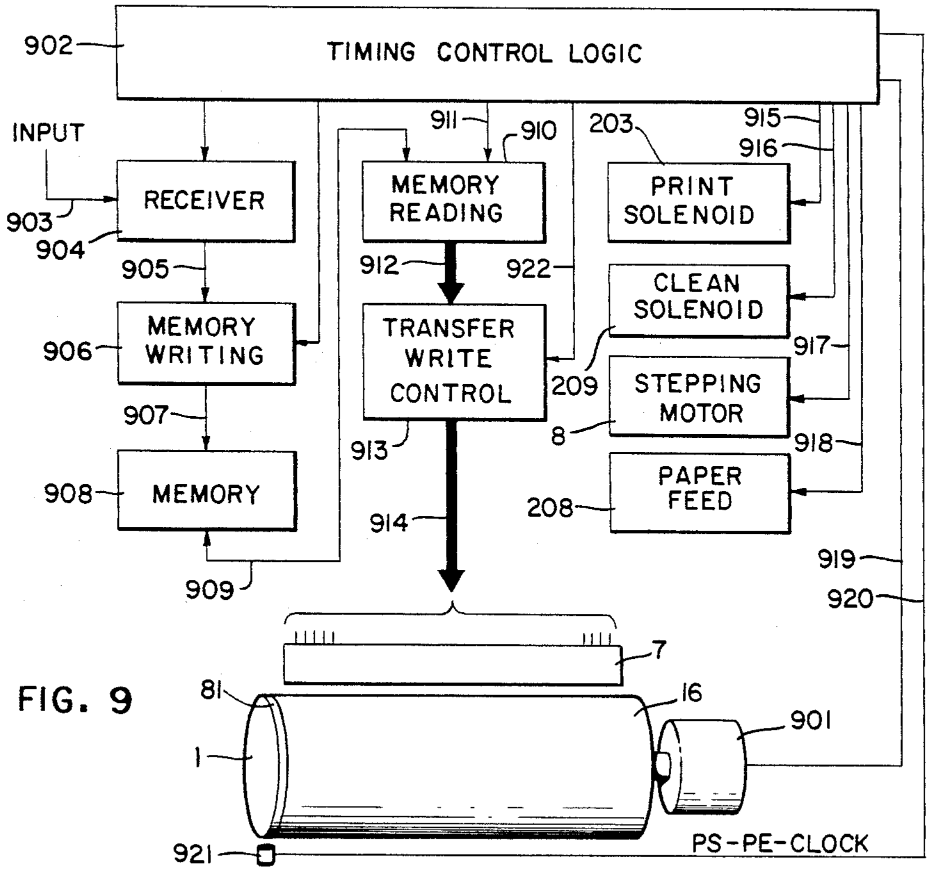
FIG. 9 is a schematic drawing.

The perspective view of FIG. 1 generally includes only the elements of the printer required to understand the present invention. The drum 1 and the axle 2 of FIG. 1 are driven at a uniform speed by a motor 901 which is shown in FIGS. 1 and 9. The direction of rotation, as shown by the arrow on the end of the drum is clockwise as viewed from the exposed end of the drum.

The print head assembly 3 comprises a frame 4; guide bars 5 and 6; the nozzle assembly 7; the step motor 8, the belt 9; and the lateral motion assembly 10. The ink source 201 and tube 202 for connecting the ink source to the nozzle assembly 7 are shown in FIG. 2.

FIG. 1 also includes the paper support surface 11; the printing pressure roller 12; and the cleaning assembly 13. The drum cleaning medium 14 and the surface 16 of the drum 1 are brought into contact by the pressure of the roller 17 which is moved toward the drum 1 in proper time relation with movement of the printing roller 12. The cleaning medium 14 prepares the surface 16 of the transfer drum 1 to receive indicia to be subsequently printed.

In FIG. 1, the transfer drum 1, the print head assembly 3, and the drum cleaning assembly 13 are all mounted between two frame plates of which only the right hand plate 22 is shown in FIG. 1. A portion of the left hand frame plate 41 is shown in FIG. 4 which illustrates how the motor 8 and the lateral motion assembly 10 are secured to the frame plate 41.

Figure 2:
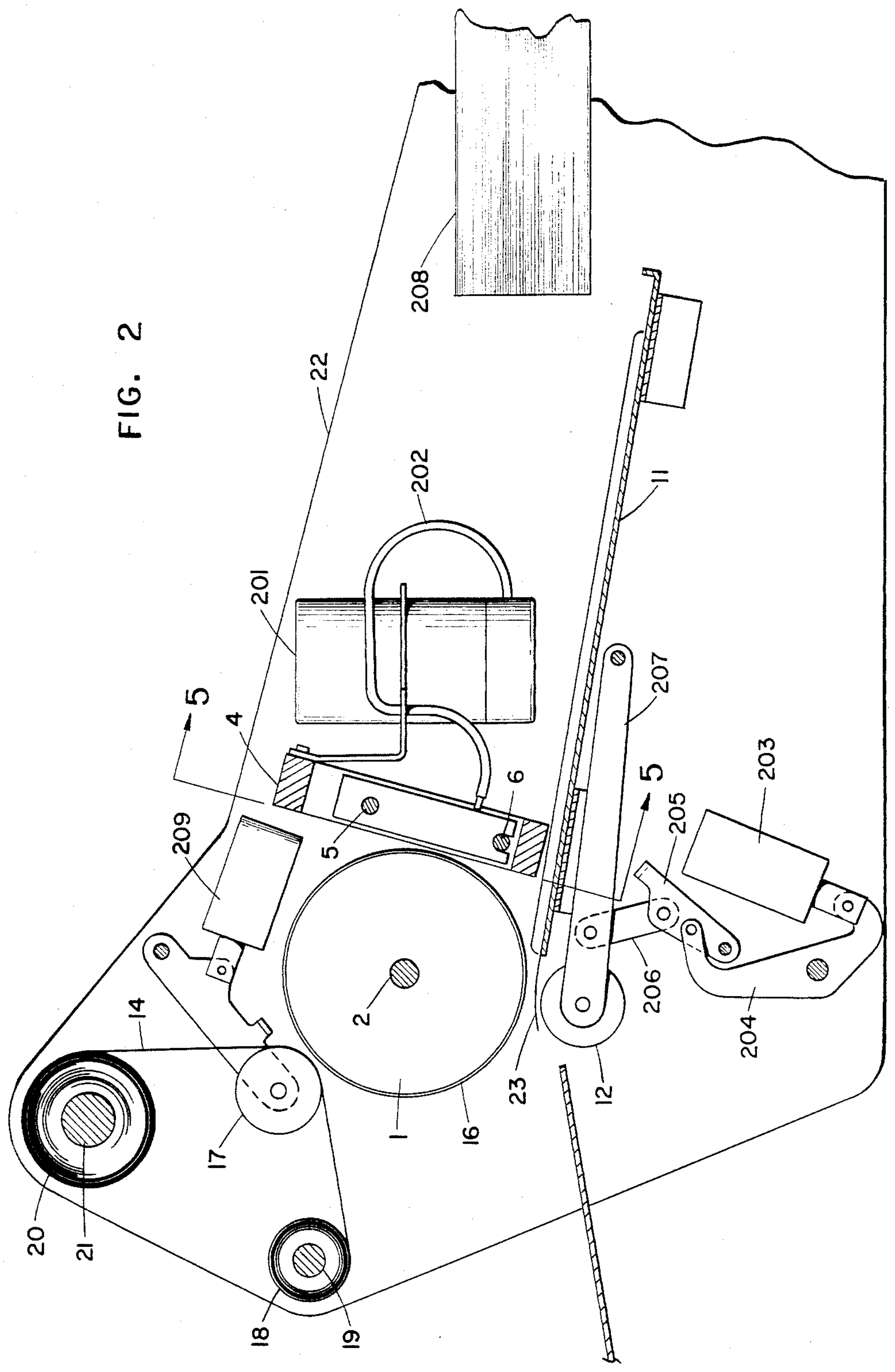
FIG. 2 is a schematic side view of a portion of the printer of FIG. 1.

FIG. 2 illustrates a manner in which ink from the source 201 may be brought to the nozzle assembly 7 by a tube 202.

FIG. 2 also illustrates typical arrangements for moving the rollers 12 and 17 towards the transfer drum 1 to cause transfer of indicia from the surface 16 of the drum 1 to the paper 23, and to bring the cleaning medium 14 in contact with the transfer surface 16. FIG. 2 shows a single sheet of paper on the support 11 and it is contemplated that sheets of paper are to be fed a sheet at a time to the support 11 by the assembly 208 immediately after the preceding sheet has been printed. The function of the paper printing pressure roller 12 is to bring the paper sheet 23 into rolling, essentially line contact with the transfer surface 16 of the transfer drum along a line which is parallel to the axis of the drum 1. Care is taken to assure that there is uniform contact between the paper 23 and the transfer drum along the entire line of contact in order to assure uniform transfer of indicia from the drum to the paper. The printing pressure roller 12 is formed of a material that will not unduly compress under the influence of the pressures provided by the solenoid 203 and the linkages 204 through 207 so as to avoid excessive flattening of that roller at the line of contact of the transfer drum. If the roller 12 is permitted to compress to excess there may be smearing of the image transferred to the paper sheet 23.

Figure 3:
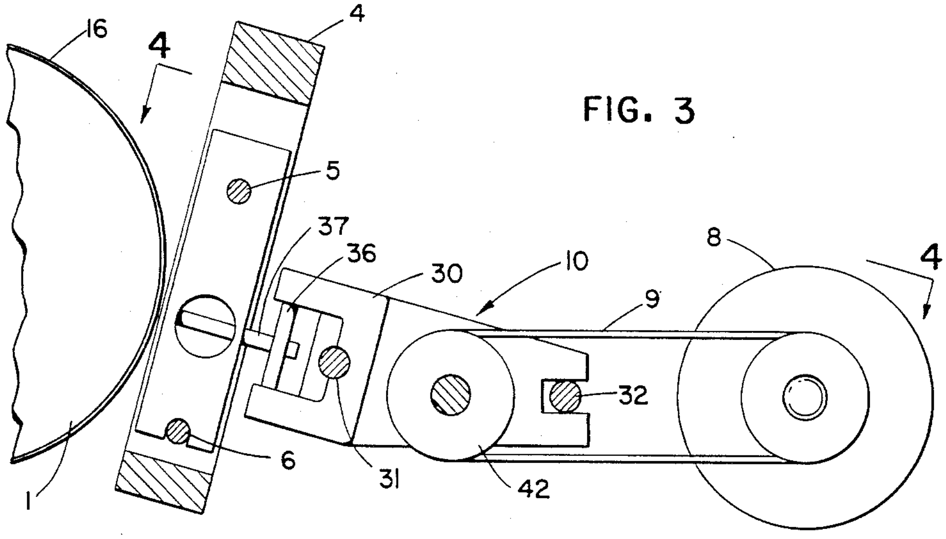
FIGS. 3 and 4 are side and top views of a part of the mechanism of FIG. 1.
Figure 4:
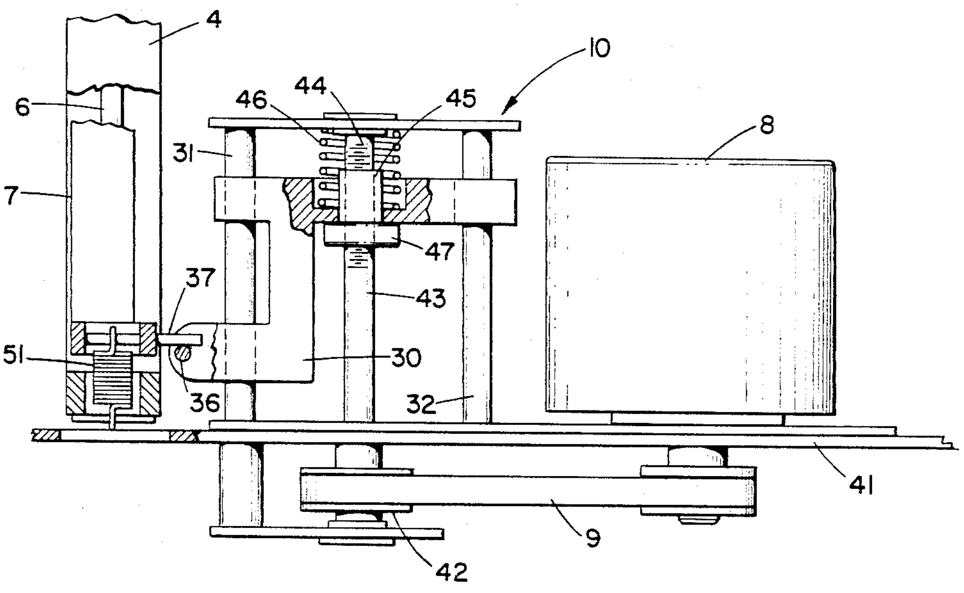
Figure 5:
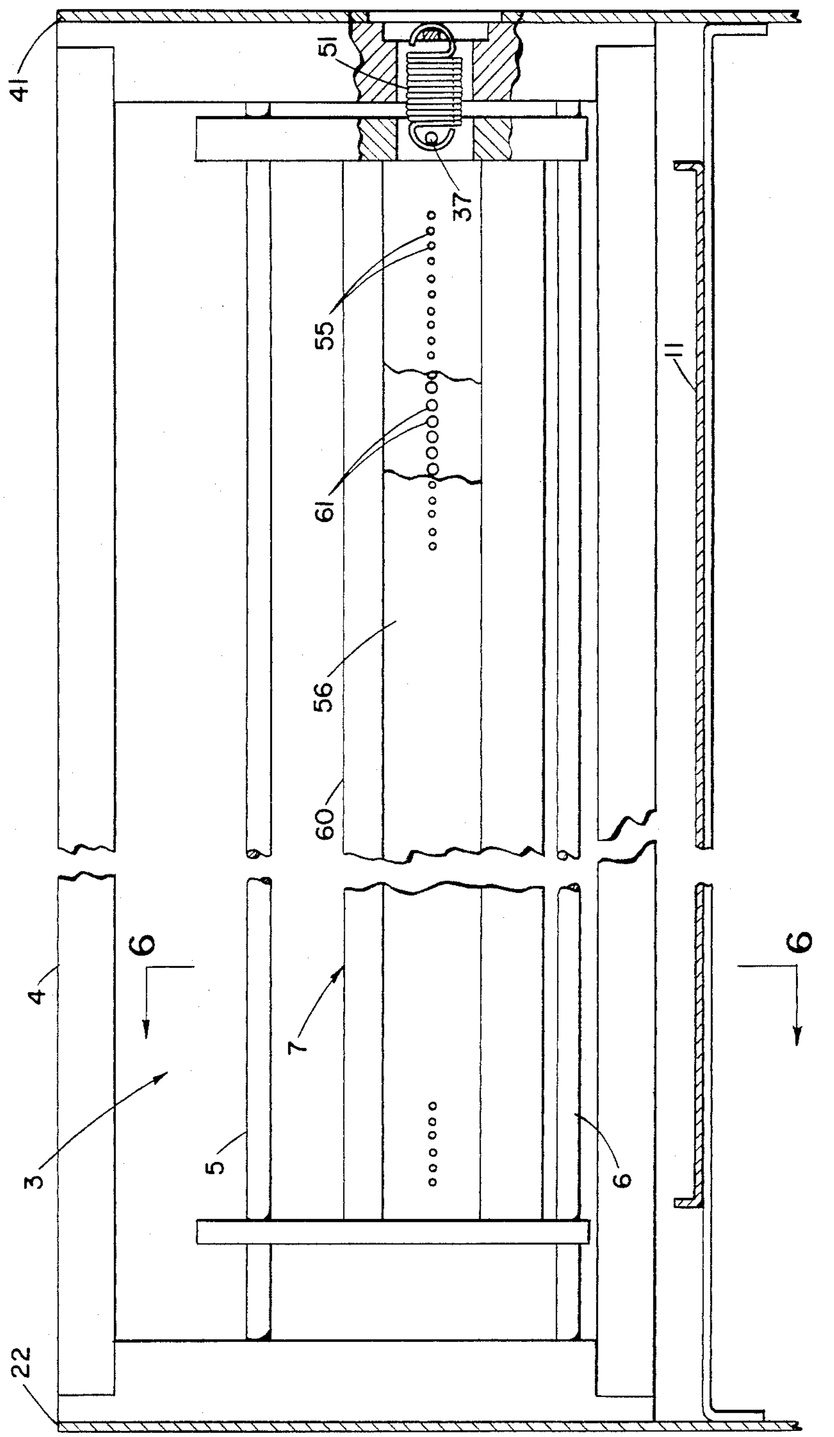
FIG. 5 is a view of the print head of FIG. 1 as seen from the transfer medium.

FIGS. 3 and 4 illustrate the manner in which the nozzle assembly 7 is moved in incremental steps to access successive tracks on the transfer medium 1. In the illustrative assembly of FIGS. 3 and 4 the nozzle assembly 7 is moved laterally on the upper guide rod 5 and the lower guide rod 6 under the influence of the lateral motion assembly 10 and the return spring 51 which is shown in FIG. 5. The rotary motion of the output shaft of the stepping motor 8 is transferred to the shaft 43 by the belt 9 and the pulley 42. Threads 44 on the shaft 43 engage internal threads 45 on the nut 47. The nut 47 and the body 30 are held in a fixed relation by splines not shown and by the spring 46.

The successive tracks on the transfer medium are accessed by energizing the stepping motor 8 for a fixed number of steps sufficient to effect the desired lateral motion of the print head assembly 7. After each nozzle has accessed all tracks of a corresponding succession of tracks, the stepping motor is operated in the reverse direction of rotation to cause the body 30 and thus the nozzle assembly 7 to return to an initial printing position (LS). The return spring 51 serves to assure accurate positioning of the nozzle assembly since any play in the meshing of threads 44 on the shaft 43 with the threads 45 on the nut 47 will be eliminated. The body 30 may be returned to the initial position (LS) as described above or alternatively may be returned to a starting position which is to the left of the initial position. The assembly is then advanced to the initial printing position (LS). This manner of operation tends to further minimize the effects of any play in the above referenced threads 44 and 45. As shown in FIGS. 3 and 4 the body 30 of the lateral motion assembly 10 is moved laterally on the guide rods 31 and 32.

FIG. 5 is a view of the print head assembly as seen from the transfer medium 16. The nozzles 55 are in a common line which is parallel to the axis of the transfer drum 1. In the illustrative embodiment, the nozzles 55 are spaced on one-tenth inch centers and each nozzle is proportioned so as to create droplets of ink having a diameter in the order of 0.002 to 0.003 inch. With these dimensions in mind, the lateral motion of the nozzle assembly is accomplished in twenty equal steps which serves to create patterns of 200 lines per inch across the width of the transfer medium and thus correspondingly across the width of the printing medium 23.

The manner in which alphanumeric characters are created by depositing droplets of ink on the surface 16 of the drum 1 is illustrated in FIG. 7. FIG. 7 illustrates the letters REL as they would appear on the surface 16 when viewed from the nozzle assembly 7. As noted above herein, the nozzles 55 are spaced apart on 0.1 inch centers. With this spacing, the characters which are illustrated in FIG. 7 occur at a printing pitch of ten characters per inch. The area in which a character appears in the text on the transfer medium is termed a character cell herein. In the illustrative assembly a character cell has twenty equally spaced lateral positions and thirty-three equall spaced vertical positions. The letters R, E and L as illustrated are each comprised of fourteen horizontal elements and 23 vertical elements. In this arrangement the spacing between one character and the next is provided by space to the right of each character as the character appears in normal english text. This organization of indicia to create characters accommodates the printing of both upper and lower case characters and the printing of characters having vertical descenders and ascenders.

While FIG. 7 serves to illustrate how the subject printer may be utilized to create alphanumeric characters at a first printing pitch such as ten characters per inch and six lines of text per inch, the subject printer is adaptable to the printing of not only alphanumeric text of a fixed format and pitch but also to the printing of text of various formats and pitch and graphics. It will be readily appreciated that the printing of information with a resolution of 200 lines per inch, both horizontal and vertical, permits the presentation of not only black and white line information, but also permits the printing of gray scale information and of color renditions.

FIG. 6 is a cross section of the nozzle assembly 7 and of the drum 1 taken along the line 6—6 illustrated in FIG. 5. The nozzles 55 are in the nozzle plate 56 which as shown in FIG. 6 is attached to the body 60. The body 60 has a plurality of reservoirs 61 equal in number to the number of nozzles 55 and a corresponding number of piezoelectric actuators 62 also equal in number to the number of nozzles 55. Ink is distributed from the ink source 201 (see FIG. 2) and the distribution tube 202 through passages such as 63 and 64. The actuators 62 are selectively energized electrically to force droplets of ink through the corresponding nozzles 55 at the desired times to create desired patterns of indicia on the transfer surface 16.

The physical parameters of the drum surface, the ink, the nozzle size, the speed of rotation of the drum 1 and the number of tracks served by each nozzle are chosen to assure faithful reproduction of the indicia represented by the electrical signals which selectively energize the actuators 62 of the plurality of nozzles 55.

The surface 16 of the transfer drum 1 may be of any material which provides a smooth surface for receiving the droplets of ink from the nozzles 55. The surface may be formed of any one of a large number of plastics, of metal or of ceramic. While the composition of the ink is not critical, it must have certain physical characteristics. The ink must be capable of forming small droplets i.e. in the order of 0.002 inch to 0.003 inch on the surface 16 and these droplets of ink in combination with the surface 16 must form a relatively high contact angle so as not to wet the surface 16. However, the combination of ink and the surface 16 must be such that droplets of ink projected from the nozzles 55 will stay in their intended positions on the drum as it is rotated. The characters illustrated in FIG. 7 are composed of independent droplets which do not wet the surface 16, which do not coalesce to form large droplets, and which do not appreciably evaporate prior to transfer of the image to the printing medium. In certain applications e.g., color renditions, droplets may advantageously be permitted to coalesce.

The ink must not contain particulate matter such as carbon. Inks having a polyhydric alcohol base colored with dyes have been found to be satisfactory for use in the subject printer.

An important characteristic of any ink jet printer is the energy required to selectively project droplets of ink through the nozzles. The impedance of the nozzles, and thus the energy required, can be controlled by controlling the thickness of the nozzle plate in the vicinity of the nozzle holes. With nozzle holes of 0.002 to 0.003 inches in diameter a nozzle plate having a thickness of 0.001 inch or less at the nozzle holes provides a satisfactory low impedance. The thickness of the nozzle plate in the vicinity of the nozzle holes is dictated on the one hand by the need for the nozzle plate to withstand the forces imparted to the ink by the actuators 62, and by the desire to keep the impedance and the energy requirements low. Experience shows that a ratio of nozzle hole diameter to the thickness of the nozzle plate in the vicinity of the nozzle holes of at least two is desirable.

Although not limiting, a transfer surface 16 having a hardness in the range of D40 to D75 has been found to provide satisfactory operation. It has been found that the surface of the transfer media may be of plastic material chosen, by way of example, from any one of the following: teflon, tefzel, fluorinated ethylene, cellulose acetate, urethane, polyethylene, polyethylene tetrapenthalate (PET), and mylar. In addition, smooth metal and ceramic surfaces can provide satisfactory operation.

All of the above describes the physical arrangements which serve to prepare the surface 16 for the transfer of indicia from the nozzles 55 to the surface and for subsequently transferring that indicia from the transfer surface 16 to the printing medium e.g. a sheet of paper 23. Up to this point reference has been made to movement of the rollers 12 and 17 at appropriate times as well as movement of the nozzle assembly 7 at appropriate times. With this background it is now appropriate to provide a general description in which information representative of indicia to be printed is brought to the nozzle assembly and how the presentation of such information is coordinated with the actions of the stepping motor 8, the roller 12 and the roller 17 as well as with the rotation of the drum 1.

Figure 8:
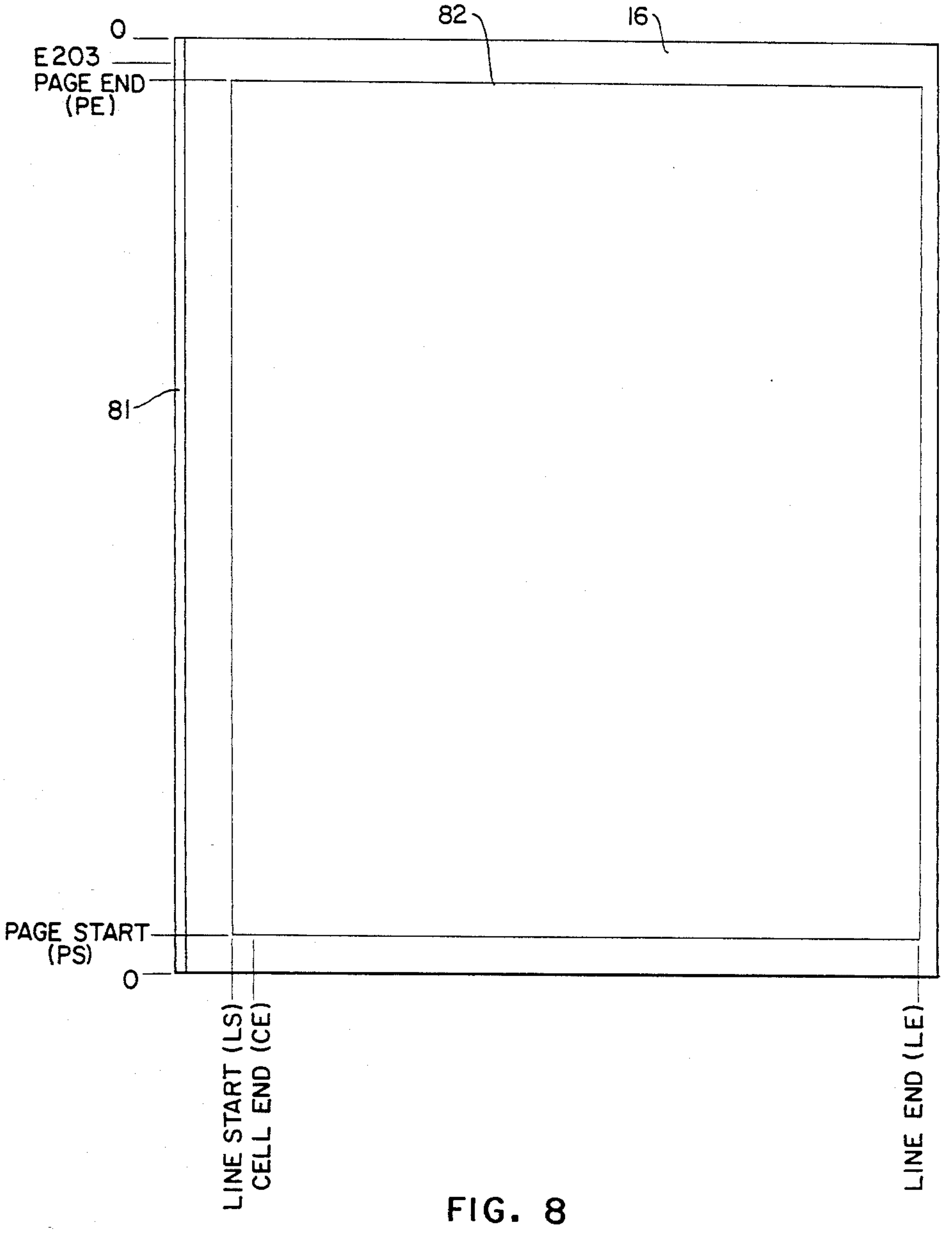
FIG. 8 illustrates the surface on the transfer drum.

FIG. 8 illustrates in flat form the surface 16 of the transfer drum 1 of FIG. 1. The uppermost horizontal line of FIG. 8 which is labeled "O" and the lowermost horizontal line "0" of FIG. 8 are one and the same line. These lines represent the line at which the flat sheet is joined on the surface 16 of the drum 1. However, if the surface 16 of the drum 1 is continuous there is of course no seam line.

The usable portion of the surface 16 is designated 82 in FIG. 8. It is in this area that the printing head projects patterns of droplets of ink for subsequent transfer to a printing medium such as a sheet of paper 13 in FIG. 1. As illustrated in FIG. 7 the writing of information on the transfer drum surface 16 of FIG. 8 may start at the bottom at the line labeled Page Start and may continue to the line labeled Page End as the drum is rotated clockwise as viewed from the left end of the drum in FIG. 1. The portion 81 of the moving surface 16 comprises a timing track which contains visible, magnetic, or other discernible indicia which serve to generate signals which define the page start signal, the page end signal and clock signals for controlling the timing logic 902 of FIG. 9. In the illustrative example of FIG. 9 there is shown a sensor 921 e.g. an optical sensor for reading these signals from the track 81. In the illustrative embodiment, the signals LS, CE and LE which are representative of "line start", "cell end" and "line end" are all generated within the timing control logic circuit 902.

Figure 10:
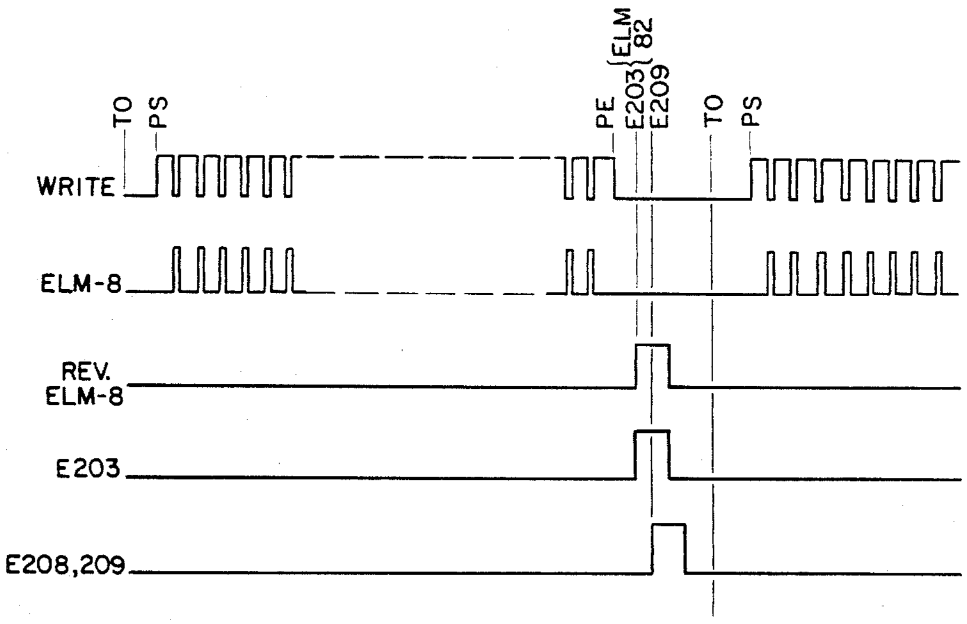
FIG. 10 is a timing diagram.

As explained earlier herein, in the illustrative embodiment, the motor 901 for driving the moving surface 16 on the drum 1 causes the drum to rotate at a substantially uniform speed past the jets of the printing head. This arrangement is by way of example only and it is possible to advance the transfer medium surface in steps in coordination with the projection of droplets of ink onto the transfer medium surface 16. The timing of the principal events of the circuitry of FIG. 9 is illustrated in FIG. 10. In the timing diagram of FIG. 10, only those events related to the transfer of information from the memory 908 to the transfer write control 913 and the control of the various elements of the printer are illustrated. That is, FIG. 10 is not concerned with the receipt of new data over the input line 903 by the receiver 904 and the writing of new data into the memory 908 by means of the memory writing circuitry 906 and the path 907. For the present discussion it is assumed that the memory 908 contains a full statement of the data which is to be presented.

In the example in FIGS. 9 and 10 the memory reading circuitry 910 receives control signals over the path 911 and in turn generates address and control signals for the memory 908 over the path 909. Memory 908 returns the requested data to the memory reading circuitry 910 via the path 909. As data, representative of indicia which is to be placed on the transfer surface 16 is obtained from the memory 908, the transfer write control circuitry 913, under control of signals on the conductor path 922, provides control signals for the print head assembly 7 via the cable 914. In FIG. 10 the first line indicates that the write signal is active for the period starting with the event PS which signifies the page beginning and stays active until the event PE which identifies page end. The write signal is thus active for each rotation of the drum 1 as the print head passes over the active transfer portion 82 and is inactive when the print head passes over the portion of the drum outside of the active transfer surface 82. During the period of time that the drum passes over the inactive portion of the transfer surface the stepping motor 8 is activated by the signal ELM-8 which serves to advance the print head to the next track in the succession of tracks served by an ink jet. As shown in FIG. 10, the motor 8 is energized to advance the assembly 7 nineteen times so that each jet of the head assembly 7 serves the assigned twenty tracks. After all tracks have been served to create patterns such as those illustrated in FIG. 7, the stepping motor 8, by a signal REV ELM-8, is operated in the reverse direction for a period of time sufficient to return the print head assembly to the initial lateral position to prepare for the receipt of a new page of data to be printed. At approximately the same time that the stepping motor 8 is energized to return the print head assembly to its initial starting position, the print solenoid 203 is energized by the signal E203 which remains active for a period of time sufficient for the transfer of the indicia on the transfer of the indicia on the transfer medium 16 to the print medium e.g. the sheet of paper 23 illustrated in FIG. 1. In the illustrative embodiment, after printing has been completed the paper sheet feed 208 is energized to place a new sheet of paper on the support surface 11 in preparation for printing the next page from the transfer drum 1. Also, optionally the cleaning solenoid 209 is energized to bring the cleaning web 14 in contact with the surface 16 immediately after transfer of the indicia to the paper has occurred.

The illustrative embodiment utilizes an asynchronous drop on demand ink jet printing head in which the actuators and activated in proper timed relation to create patterns of dots on the transfer medium surface 16. While this is a convenient structure for practicing this invention other types of ink jet print head assemblies may be used with success. For example, pressure ink jet assemblies which utilize charged drops and deflection plates for selectively placing droplets of ink on the surface 16 may also be used. It is only necessary that the print head assembly have the ability to create droplets of the priorly described characteristics.

What is claimed is:

1. An ink jet page printer comprising:

a source of ink (201);

one or more print heads (7) each comprising a plurality of jets (55) and a corresponding plurality of actuators (62) responsive to electrical signals for selectively projecting droplets of ink;

a transfer medium (1) having a moving surface (16) thereof adjacent to but spaced apart from said print head (7) for receiving said projected droplets;

circuitry (902) for generating said electrical signals for controlling said print heads to create patterns of droplets of ink on said moving surface (16) said circuitry comprising a memory (908) for storing indicia representative of patterns of droplets of ink to be projected on said moving surface (16), a means (906) for writing indicia into said memory in response to received input signals, a means (910) for reading indicia from said memory and means (913) for controlling said printing heads (7) in accordance with said indicia read from said memory;

an arrangement (12, 203 to 207) for selectively transferring the droplet patterns from said transfer medium surface (16) to a printing medium (23), said arrangement comprising a printing medium support surface (11) and a printing pressure roller assembly (12, 204 to 207) for pressing a printing medium (23) supported on said support surface into line contact with said transfer medium surface (16) when enabled, and means (203) for selectively enabling said printing pressure roller assembly;

a printing medium feed assembly (208) for storing a plurality of sheets of printing medium (23) and for moving said sheets one at a time to said printing medium support surface (11) in timed sequence with the operation of said printing pressure roller assembly (12, 204 or 207);

means (81, 921) coordinated with the movement of said moving surface for generating control signals for said circuitry (902) said means coordinated with the movement of said transfer medium moving surface (16) comprising a timing track containing optically or magnetically discernible indicia (81) disposed on said surface (16) and means (921) for generating control signals in response to said discernible indicia;

lateral motion means (8, 9, 10, 51) for controlling moving said print heads (7) in a first direction transverse to the direction of travel of said transfer medium moving surface (16);

means (8) for controlling said lateral motion means to move said print heads (7) in coordination with the movement of said transfer medium such that each ink jet (55) successively serves the tracks of a plurality of adjacent parallel tracks on said transfer surface (16);

means for controlling said lateral motion means to move said print heads in a direction opposite to said first transverse direction so as to position said ink jet over the first track of its plurality of tracks; and an arrangement (13) for cleaning said transfer medium (16) surface after the droplet patterns have transferred from said transfer medium surface to said printing medium (23), said arrangement (13) including a roller (17) for pressing a cleaning medium (14) into contact with the transfer medium surface (16) when enabled, and means (209) for selectively enabling said cleaning arrangement (13).

* * * * *

UNITED STATES PATENT OFFICE
CERTIFICATE OF CORRECTION

PATENT NO. : 4,538,156

DATED : August 27, 1985

INVENTOR(S) : David B. Durkee; Alan J. Liebman

It is certified that error appears in the above-identified patent and that said Letters Patent are hereby corrected as shown below:

Column 1, line 24, "hend" should read --head--,
Column 2, line 66, "of" should read --on--,
Column 3, line 59, "equall" should read --equally--,
Column 5, line 42, "13" should read --23--,
Column 6, line 61, "and" should read --are--.

Signed and Sealed this

Twenty-fifth Day of October, 1988

*Attest:*

DONALD J. QUIGG

*Attesting Officer*

*Commissioner of Patents and Trademarks*